(12) United States Patent
Yasuda

(10) Patent No.: US 11,916,682 B2
(45) Date of Patent: Feb. 27, 2024

(54) AUDIO APPARATUS AND AUDIO APPARATUS OPERATION METHOD

(71) Applicant: Sony Group Corporation, Tokyo (JP)

(72) Inventor: Mitsuyoshi Yasuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 26 days.

(21) Appl. No.: 17/782,663

(22) PCT Filed: Dec. 25, 2019

(86) PCT No.: PCT/JP2019/050868
§ 371 (c)(1),
(2) Date: Jun. 6, 2022

(87) PCT Pub. No.: WO2021/130909
PCT Pub. Date: Jul. 1, 2021

(65) Prior Publication Data
US 2023/0013153 A1 Jan. 19, 2023

(51) Int. Cl.
*H04L 1/1867* (2023.01)
*H04L 5/00* (2006.01)
*H04R 1/10* (2006.01)
*H04L 1/00* (2006.01)

(52) U.S. Cl.
CPC .......... *H04L 1/1867* (2013.01); *H04L 5/0055* (2013.01); *H04R 1/1041* (2013.01); *H04L 2001/0092* (2013.01); *H04R 2420/07* (2013.01)

(58) Field of Classification Search
CPC ................. H04L 1/1867; H04L 5/0055; H04L 2001/0092; H04L 1/0061; H04L 1/1854; H04R 1/1041; H04R 2420/07; H04R 25/552; H04R 25/554; H04R 5/033; H04W 84/20; H04W 4/80
See application file for complete search history.

(56) References Cited

U.S. PATENT DOCUMENTS

| | | | |
|---|---|---|---|
| 10,244,307 B1 | 3/2019 | Tong et al. | |
| 2012/0058727 A1 | 3/2012 | Cook et al. | |
| 2016/0219358 A1 | 7/2016 | Shaffer | |
| 2017/0311105 A1* | 10/2017 | Hariharan | H04R 29/001 |
| 2018/0084456 A1* | 3/2018 | Gostev | H04L 1/1685 |
| 2019/0174232 A1* | 6/2019 | Tong | H04W 4/80 |
| 2019/0230459 A1 | 7/2019 | Sridharan | |

FOREIGN PATENT DOCUMENTS

JP 2018-526914 A 9/2018

OTHER PUBLICATIONS

International Search Report and Written Opinion dated Feb. 18, 2020, received for PCT Application PCT/JP2019/050868, filed on Dec. 25, 2019, 9 pages including English Translation.

* cited by examiner

*Primary Examiner* — Thien Nguyen
(74) *Attorney, Agent, or Firm* — XSENSUS LLP

(57) ABSTRACT

In an audio apparatus including a first device and a second device that each receive the same audio data transmitted from a source device, a device having the worse reception environment of the audio data out of the first device and the second device, operates as a primary device that performs a retransmission request for the audio data to the source device, and a device having the better reception environment operates as a secondary device that performs the retransmission request for the audio data to the primary device.

6 Claims, 9 Drawing Sheets

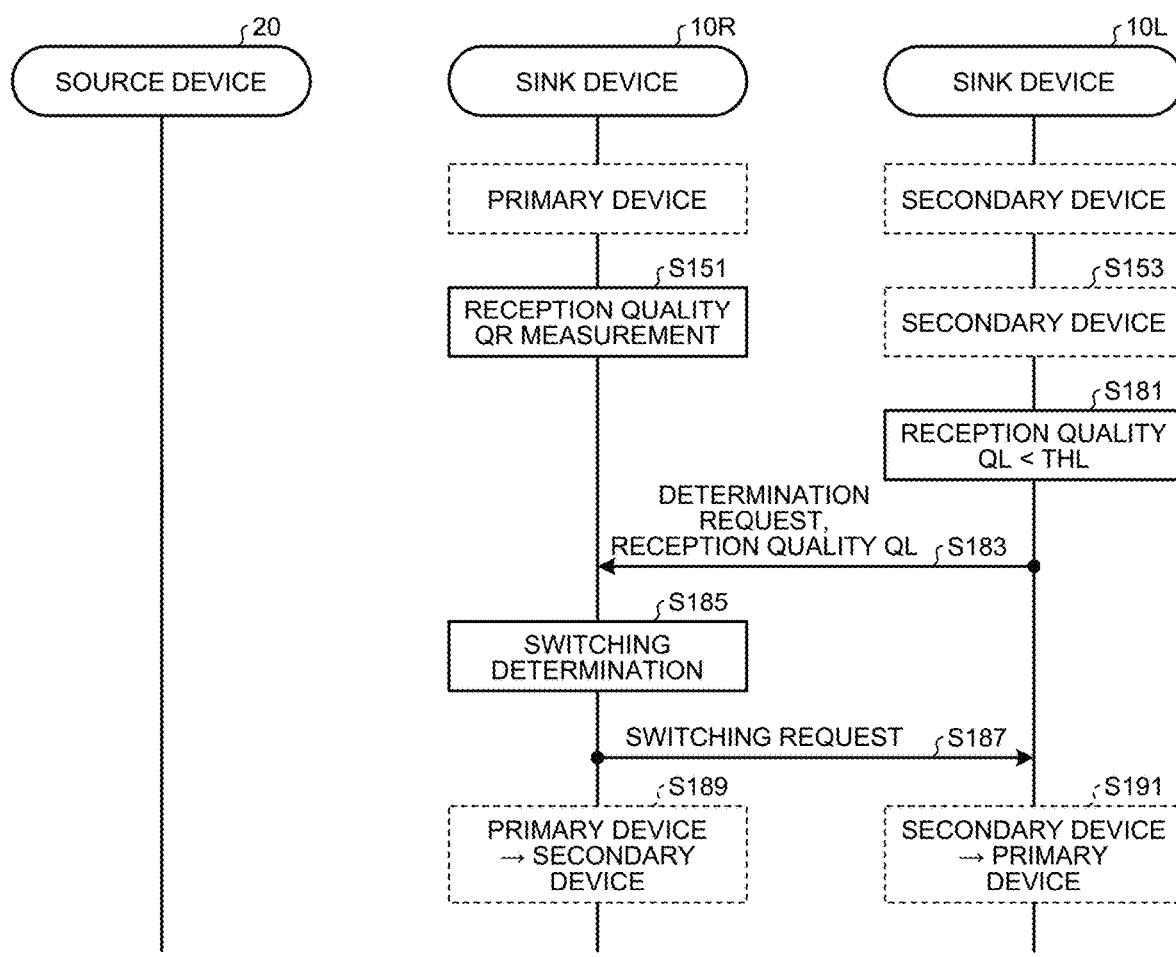

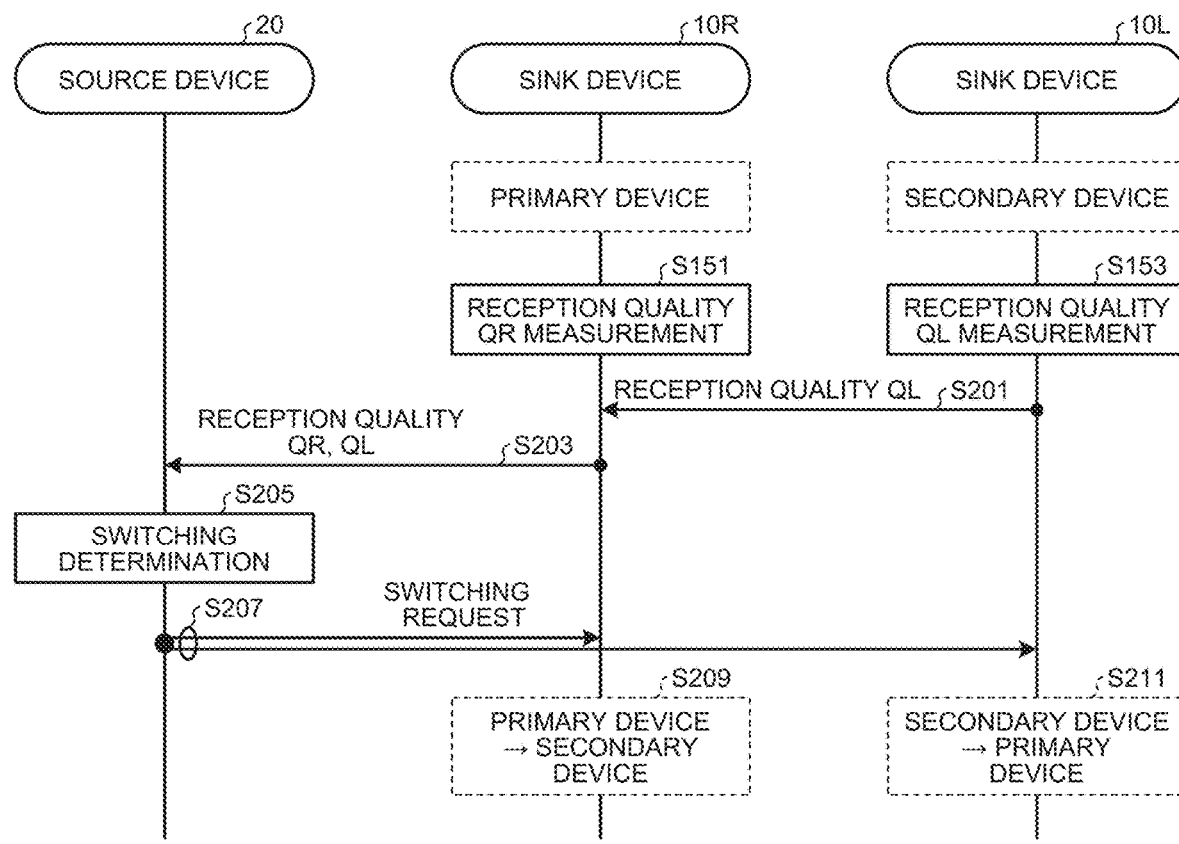

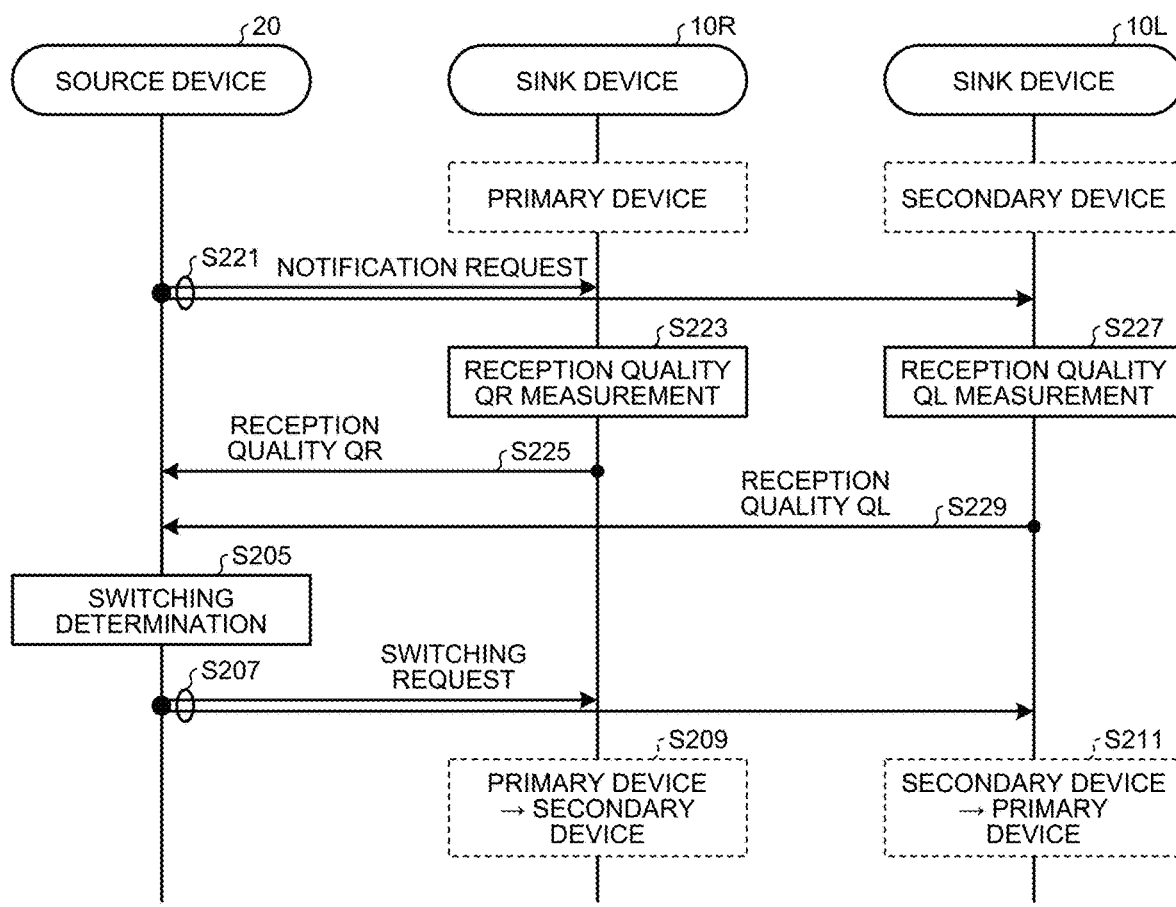

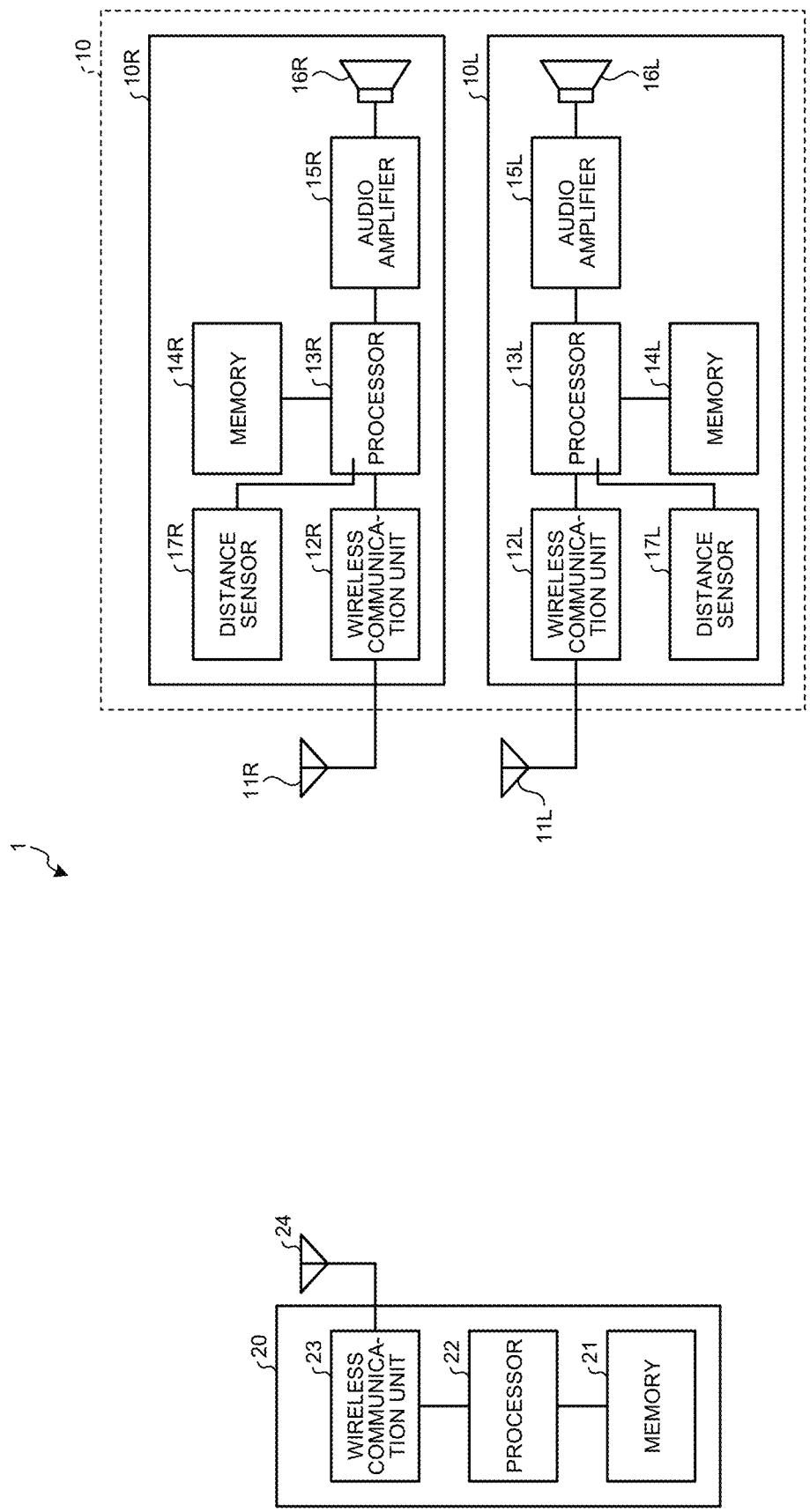

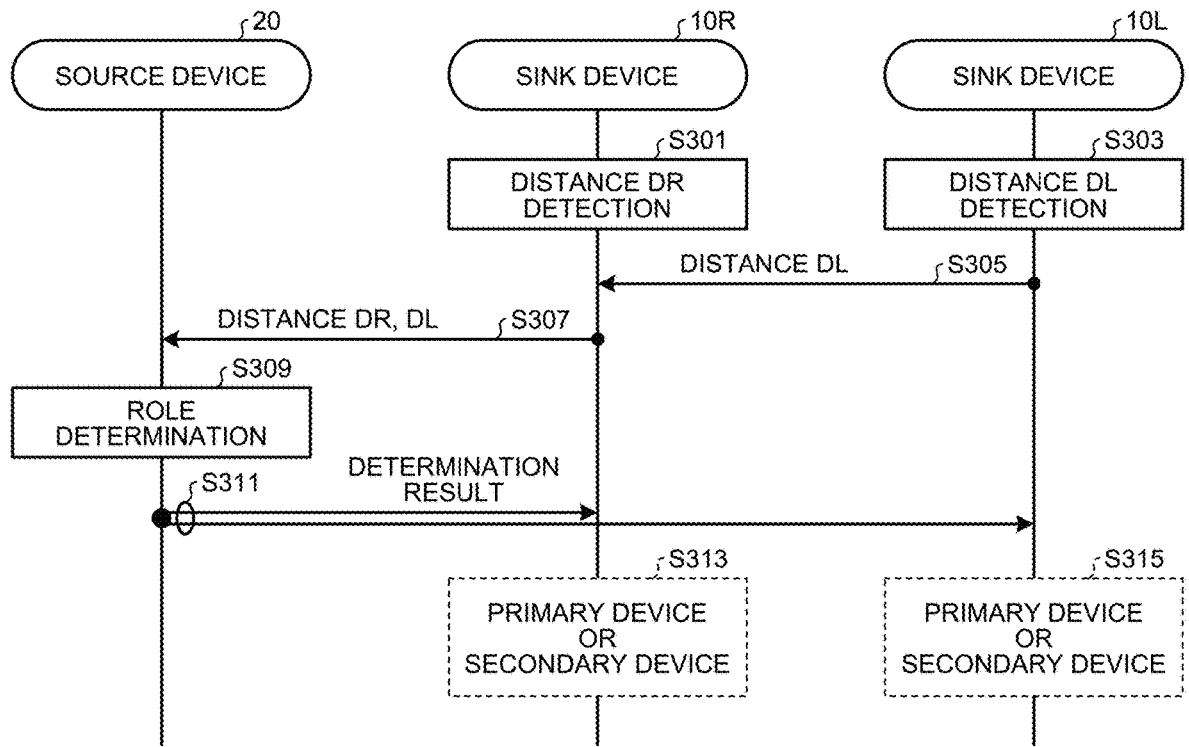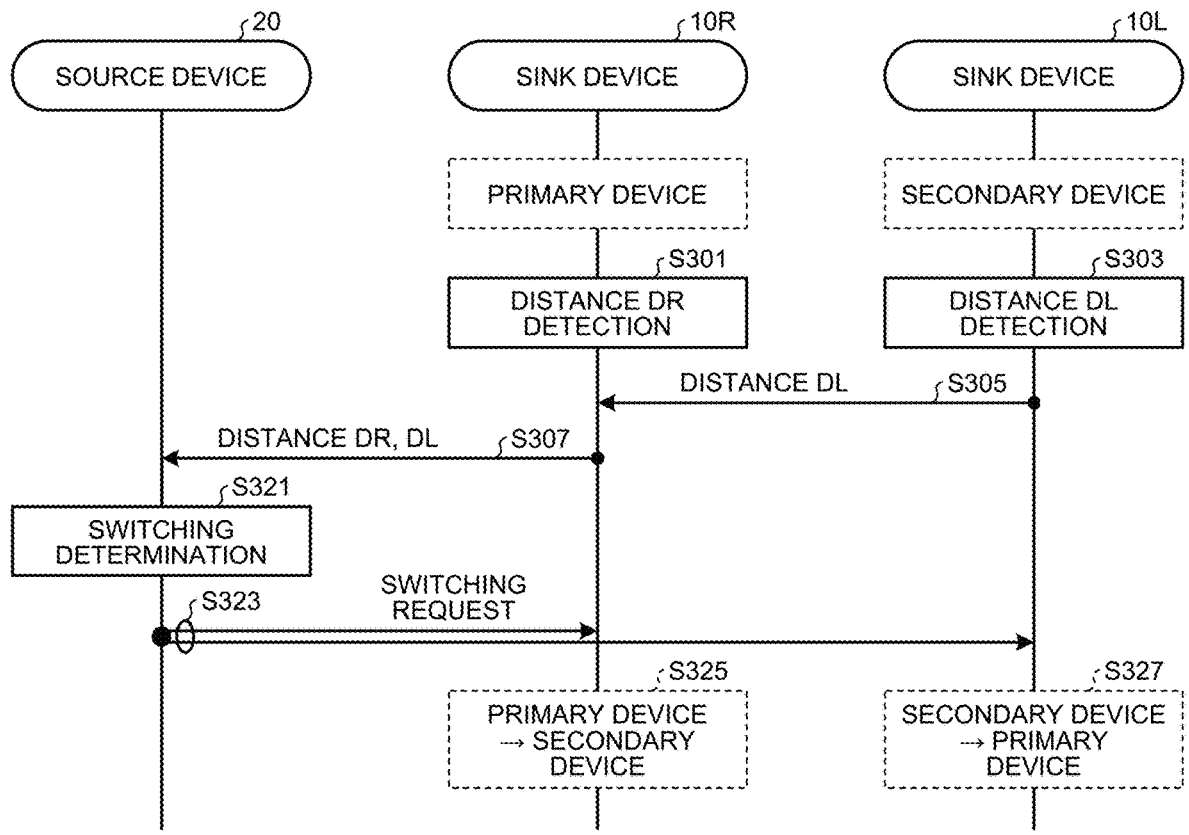

AUDIO APPARATUS AND AUDIO APPARATUS OPERATION METHOD

CROSS-REFERENCE TO RELATED APPLICATION

The present application is based on PCT filing PCT/JP2019/050868, filed Dec. 25, 2019, the entire contents of which is incorporated herein by reference.

FIELD

The present disclosure relates to an audio apparatus and an audio apparatus operation method.

BACKGROUND

In recent years, a wireless earphone connected to a device serving as a transmission source of audio data (hereinafter, may be referred to as a "source device") using near field communication such as Bluetooth (registered trademark) has attracted attention. One of the wireless earphones is an earphone (hereinafter, referred to as a "completely wireless earphone") of a system (hereinafter, may be referred to as a "completely wireless system") in which an earphone for the right ear (hereinafter, may be referred to as an "R earphone") and an earphone for the left ear (hereinafter, may be referred to as an "L earphone") are connected wirelessly. In a completely wireless earphone, one of the R earphone and the L earphone acts as a primary device, and the other earphone acts as a secondary device.

In addition, one of the completely wireless systems is a system in which the secondary device intercepts the audio data transmitted from the source device to the primary device (hereinafter, may be referred to as an "interception system"). In the interception system, each of the primary device and the secondary device receives and reproduces the same audio data transmitted from the source device. In addition, the R earphone of the interception system extracts and reproduces right-channel data (hereinafter, may be referred to as "R data") from the audio data received from the source device, and the L earphone in the interception system extracts and reproduces left-channel data (hereinafter, may be referred to as "L data") from the audio data received from the source device.

CITATION LIST

Patent Literature

Patent Literature 1: US 2012/0058727A

SUMMARY

Technical Problem

When the primary device of the interception system fails to receive the audio data, the primary device performs a retransmission request for the audio data to the source device. On the other hand, when the secondary device of the interception system fails to receive the audio data, the secondary device does not perform the retransmission request for the audio data to source device but performs the retransmission request to the primary device. Therefore, when the secondary device fails to receive the audio data, communication occurs between the primary device and the secondary device (hereinafter, may be referred to as "P-S communication"). In addition, while the P-S communication is performed, the primary device cannot receive the audio data transmitted from the source device, and thus, ACK from the primary device to the source device is also not transmitted. For this reason, while the secondary device fails to receive the audio data and the P-S communication is performed, the audio data is frequently retransmitted from the source device to the primary device, and as a result, the sound reproduced by the primary device is likely to be interrupted.

The present disclosure proposes a technique capable of suppressing interruption of reproduced sound.

Solution to Problem

According to the present disclosure, an audio apparatus includes a first device and a second device. The first device and the second device each receive the same audio data transmitted from a source device. A device having a worse reception environment of the audio data out of the first device and the second device operates as a primary device that performs a retransmission request for the audio data to the source device, and a device having a better reception environment out of the first device and the second device operates as a secondary device that performs the retransmission request to the primary device.

BRIEF DESCRIPTION OF DRAWINGS

FIG. 6 is a diagram illustrating an example of a processing procedure in the audio system according to the first embodiment of the present disclosure.

FIG. 7 is a diagram illustrating an example of a processing procedure in the audio system according to the first embodiment of the present disclosure.

FIG. 8 is a diagram illustrating an example of a processing procedure in the audio system according to the first embodiment of the present disclosure.

FIG. 9 is a diagram illustrating a configuration example of an audio system according to a second embodiment of the present disclosure.

FIG. 10 is a diagram illustrating an example of a processing procedure in the audio system according to the second embodiment of the present disclosure.

FIG. 11 is a diagram illustrating an example of a processing procedure in the audio system according to the second embodiment of the present disclosure.

DESCRIPTION OF EMBODIMENTS

Figure 1:
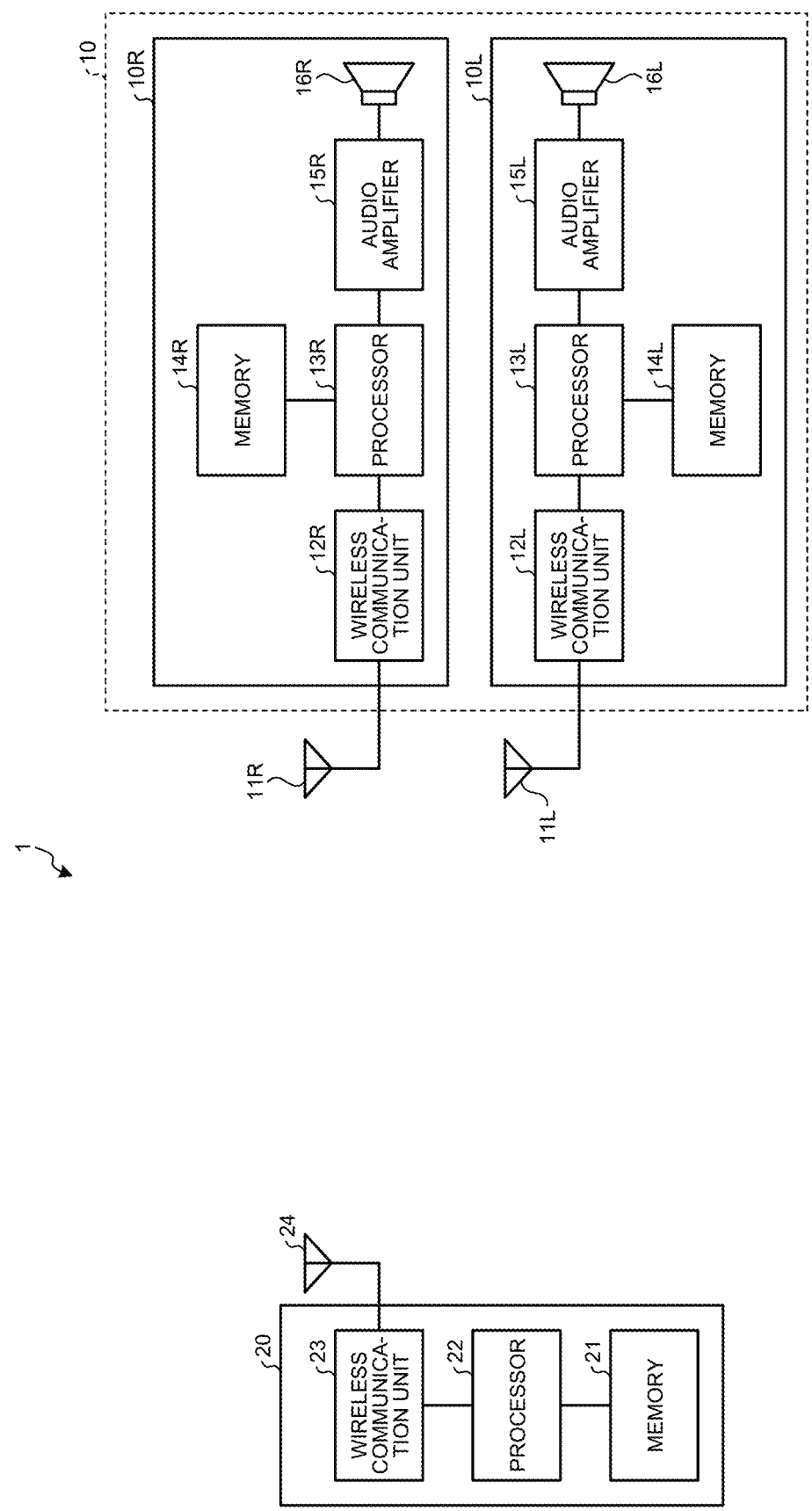
FIG. 1 is a diagram illustrating a configuration example of an audio system according to first embodiment of the present disclosure.

Hereinafter, embodiments of the present disclosure will be described with reference to the drawings. Note that, in the following embodiments, the same parts or processing may be denoted by the same reference numerals so that redundant description can be omitted.

In addition, the technique of the present disclosure will be described according to the following item order.

First Embodiment

<Configuration of an Audio System>
<Operation of the Primary Device and Secondary Device>
<Processing Procedure in the Audio System>
<First Processing Example>
<Second Processing Example>
<Third Processing Example>
<Fourth Processing Example>
<Fifth Processing Example>

Second Embodiment

<Configuration of an Audio System>
<Processing Procedure in the Audio System>
<Sixth Processing Example>
<Seventh Processing Example>

Effects of the Disclosed Technique

First Embodiment

<Configuration of an Audio System>

FIG. 1 is a diagram illustrating a configuration example of an audio system according to a first embodiment of the present disclosure. In FIG. 1, an audio system 1 includes an audio apparatus 10 and a source device 20. The audio apparatus 10 includes a sink device 10R and a sink device 10L which are a pair of sound reproducing devices. Examples of the source device 20 include a smart device such as a smartphone or a tablet terminal. Furthermore, for example, when the audio apparatus 10 is a completely wireless earphone, the sink device 10R is an R earphone, and the sink device 10L is an L earphone. The audio apparatus 10 receives audio data using an interception system.

Figure 2:
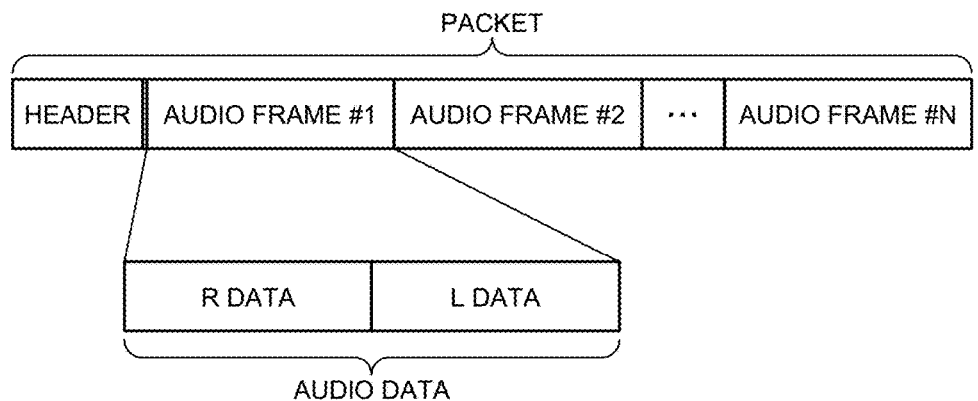
FIG. 2 is a diagram illustrating a configuration example of a packet according to the first embodiment the present disclosure.

The source device 20 includes a memory 21, a processor 22, a wireless communication unit 23, and an antenna 24, and transmits the audio data. The processor 22 performs cyclic redundancy check (CRC) encoding and packetizing on the audio data stored in the memory 21 and the streamed audio data, and outputs a packet including the audio data to the wireless communication unit 23. The wireless communication unit 23 transmits the packet via the antenna 24. FIG. 2 is a diagram illustrating a configuration example of the packet according to the first embodiment of the present disclosure. The packet illustrated in FIG. 2 includes a header and N frames of audio frames #1 to #N, and each of the audio frames #1 to #N includes R data and L data as audio data. The processor 22 may perform CRC encoding and packetizing on the audio data received by the source device 20 as needed using a communication line.

The sink device 10R includes an antenna 11R, a wireless communication unit 12R, a processor 13R, a memory 14R, an audio amplifier 15R, and a speaker 16R. The wireless communication unit 12R receives a packet transmitted from the source device 20 via the antenna 11R, and outputs the received packet to the processor 13R. The processor 13R extracts the audio data from the packet and performs CRC on the audio data before decoding. When no error is detected in the audio data as a result of the CRC, the processor 13R stores the audio data before decoding in the memory 14R for a certain period of time, extracts R data from the audio data and decodes the R data, D/A converts the R data after decoding, and outputs the R data to the audio amplifier 15R. On the other hand, when an error is detected in the audio data as a result of the CRC, the processor 13R discards the packet. In addition, when an error is detected in the audio data when the sink device 10R operates as the primary device, the processor 13R may transmit NACK to the source device 20 via the antenna 11R using the wireless communication unit 12R. Furthermore, when an error is detected in the audio data when the sink device 10R operates as the secondary device, the processor 13R may transmit NACK to the sink device 10L operating as the primary device via the antenna 11R using the wireless communication unit 12R. The audio amplifier 15R converts the R data into a right-channel sound (hereinafter, may be referred to as an "R sound"), amplifies the converted R sound, and outputs the amplified R sound via the speaker 16R. As a result, the R sound is reproduced by the sink device 10R.

The sink device 10L includes an antenna 11L, a wireless communication unit 12L, a processor 13L, a memory 14L, an audio amplifier 15L, and a speaker 16L. The wireless communication unit 12L receives a packet transmitted from the source device 20 via the antenna 11L, and outputs the received packet to the processor 13L. The processor 13L extracts the audio data from the packet and performs CRC on the audio data before decoding. When no error is detected in the audio data as a result of the CRC, the processor 13L stores the audio data before decoding in the memory 14L for a certain period of time, extracts L data from the audio data and decodes the L data, D/A converts the L data after decoding, and outputs the L data to the audio amplifier 15L. On the other hand, when an error is detected in the audio data as a result of the CRC, the processor 13L discards the packet. In addition, when an error is detected in the audio data when the sink device 10L operates as the primary device, the processor 13L may transmit NACK to the source device 20 via the antenna 11L using the wireless communication unit 12L. Furthermore, when an error is detected in the audio data when the sink device 10L operates as the secondary device, the processor 13L may transmit NACK to the sink device 10R operating as the primary device via the antenna 11L using the wireless communication unit 12L. The audio amplifier 15L converts the L data into a left-channel sound (hereinafter, may be referred to as an "L sound"), amplifies the converted L sound, and outputs the amplified L sound via the speaker 16L. As a result, the L sound is reproduced by the sink device 10L.

Examples of the processors 22, 13R, and 13L include a central processing unit (CPU), a digital signal processor (DSP), and a field programmable gate array (FPGA). In addition, examples of the memories 21, 14R, and 14L include a random access memory (RIM) such as a synchronous dynamic random access memory (SDRAM), a read only memory (ROM), and a flash memory.

Hereinafter, the sink devices 10R and 10L may be collectively referred to as "sink device 10RL".

<Operation of the Primary Device and Secondary Device>

Figure 3:
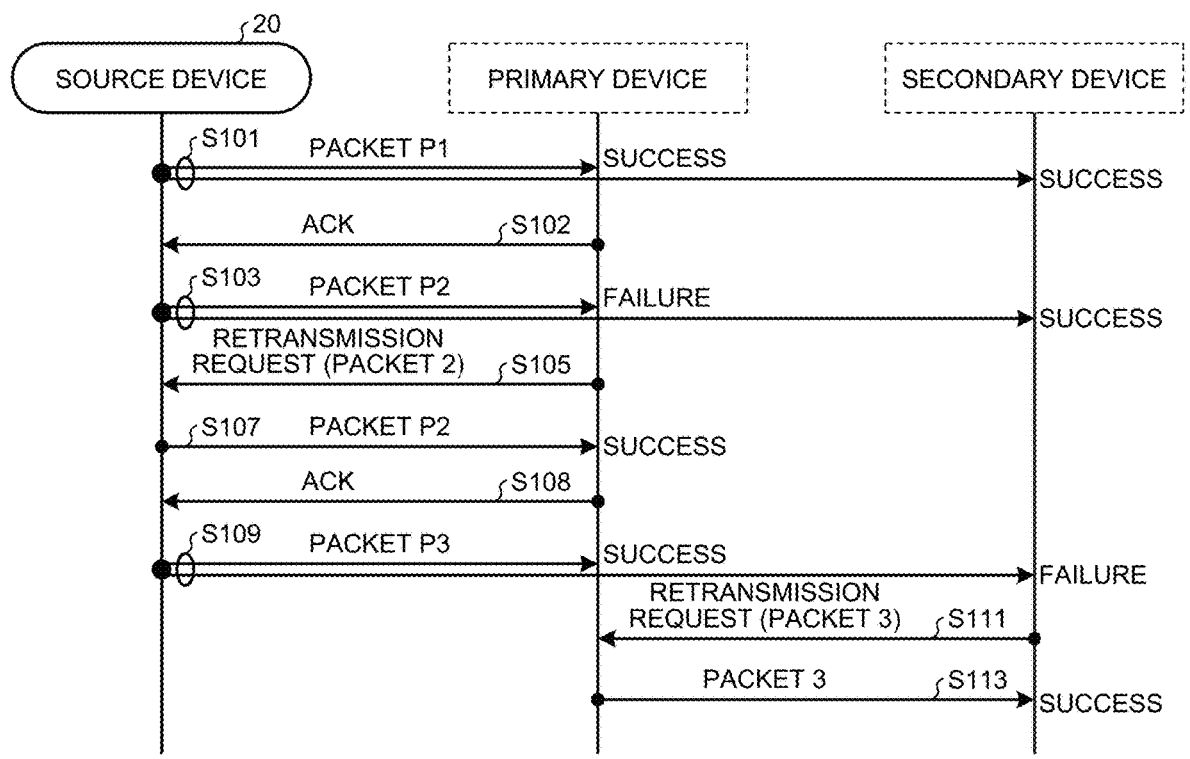
FIG. 3 is a diagram illustrating an operation example of a primary device and a secondary device according to the first embodiment of the present disclosure.

FIG. 3 is a diagram illustrating an operation example of a primary device and a secondary device according to the first embodiment of the present disclosure.

In the sink devices 10R and 10L, the sink device 10L operates as the secondary device when the sink device 10R operates as the primary device, and the sink device 10R operates as the secondary device when the sink device 10L operates as the primary device.

When the primary device of the interception system fails to receive the audio data, the primary device performs the retransmission request for the audio data to the source device 20. Examples of the retransmission request include a case where retransmission is requested by returning NACK from the primary device to the source device 20, and a case where retransmission is requested due to timeout with nothing returned from the primary device to the source device 20. On the other hand, when the secondary device of the interception system fails to receive the audio data, the secondary device may perform the retransmission request for the audio data not to the source device 20 but to the primary device. That is, the primary device and the secondary device operate as illustrated in FIG. 3, for example. Hereinafter, the antenna 11 of the primary device may be referred to as an "antenna 11P", the wireless communication unit 12 of the primary device may be referred to as a "wireless communication unit 12P", the processor 13 of the primary device may be referred to as a "processor 13P", the memory 14 of the primary device may be referred to as a "memory 14P", the audio amplifier 15 of the primary device may be referred to as an "audio amplifier 15P", and the speaker 16 of the primary device may be referred to as a "speaker 16P". In addition, hereinafter, the antenna 11 of the secondary device may be referred to as an "antenna 11S", the wireless communication unit 12 of the secondary device may be referred to as a "wireless communication unit 12S", the processor 13 of the secondary device may be referred to as a "processor 13S", the memory 14 of the secondary device may be referred to as a "memory 14S", the audio amplifier 15 of the secondary device may be referred to as an "audio amplifier 15S", and the speaker 16 of the secondary device may be referred to as a "speaker 16S".

In FIG. 3, in step S101, the source device 20 transmits a packet P1, and the primary device and the secondary device receive the packet P1. In the primary device, the processor 13P performs CRC on the audio data of the packet P1, and determines that the primary device has successfully received the audio data of the packet P1 since no error is detected in the audio data. In step S102, the processor 13P that has determined that the audio data of the packet P1 had been successfully received transmits ACK to the source device 20 via the wireless communication unit 12P and the antenna 11P. In the secondary device, the processor 13S performs CRC on the audio data of the packet P1, and determines that the secondary device has successfully received the audio data of the packet P1 since no error detected in the audio data.

Next, in step S103, the source device 20 transmits a packet P2, and the primary device and the secondary device receive the packet P2. In the primary device, the processor 13P performs CRC on the audio data of the packet P2, and determines that the primary device has failed to receive the audio data of the packet P2 since an error is detected in the audio data. In step S105, the processor 13P that has determined that the audio data of the packet P2 had failed to be received transmits NACK to the source device 20 via the wireless communication unit 12P and the antenna 11P, thereby requesting the source device 20 to retransmit the packet P2. Meanwhile, in the secondary device, the processor 13S performs CRC on the audio data of the packet P2, and determines that the secondary device has successfully received the audio data of the packet P2 since no error is detected in the audio data.

In step S107, the source device 20 that has received the retransmission request of the packet P2 in step S105 retransmits the packet P2, and the primary device receives the packet P2. In the primary device, the processor 13P performs CRC on the audio data of the packet P2, and determines that the primary device has successfully received the audio data of the packet P2 since no error is detected in the audio data. In step S108, the processor 13P that has determined that the audio data of the packet P2 had been successfully received transmits ACK to the source device 20 via the wireless communication unit 12P and the antenna 11P.

Next, in step S109, the source device 20 transmits a packet P3, and the primary device and the secondary device receive the packet P3. In the primary device, the processor 13P performs CRC on the audio data of the packet P3, and determines that the primary device has successfully received the audio data of the packet P3 since no error is detected in the audio data. In step S110, the processor 13P that has determined that the audio data of the packet P3 had been successfully received transmits ACK to the source device 20 via the wireless communication unit 12P and the antenna 11P. Meanwhile, in the secondary device, the processor 13S performs CRC on the audio data of the packet P3, and determines that the secondary device has failed to receive the audio data of the packet P3 since an error is detected in the audio data. In step S111, the processor 13S that has determined that the audio data of the packet P3 had failed to be received transmits NACK to the primary device via the wireless communication unit 12S and the antenna 11S, thereby requesting the primary device to retransmit the packet P3.

In the primary device that has received the retransmission request of the packet P3 in step S111, the processor 13P transmits the packet P3 stored in the memory 14P to the secondary device in step S113. In the secondary device, the processor 13S performs CRC on the audio data of the packet P3, and determines that the secondary device has successfully received the audio data of the packet P3 since no error is detected in the audio data.

<Processing Procedure in the Audio System>

FIGS. 4 to 8 are diagrams illustrating an example of a processing procedure in the audio system according to the first embodiment of the present disclosure. Hereinafter, first to fifth processing examples will be described as examples of the processing procedure in the audio system according to the first embodiment.

Figure 4:
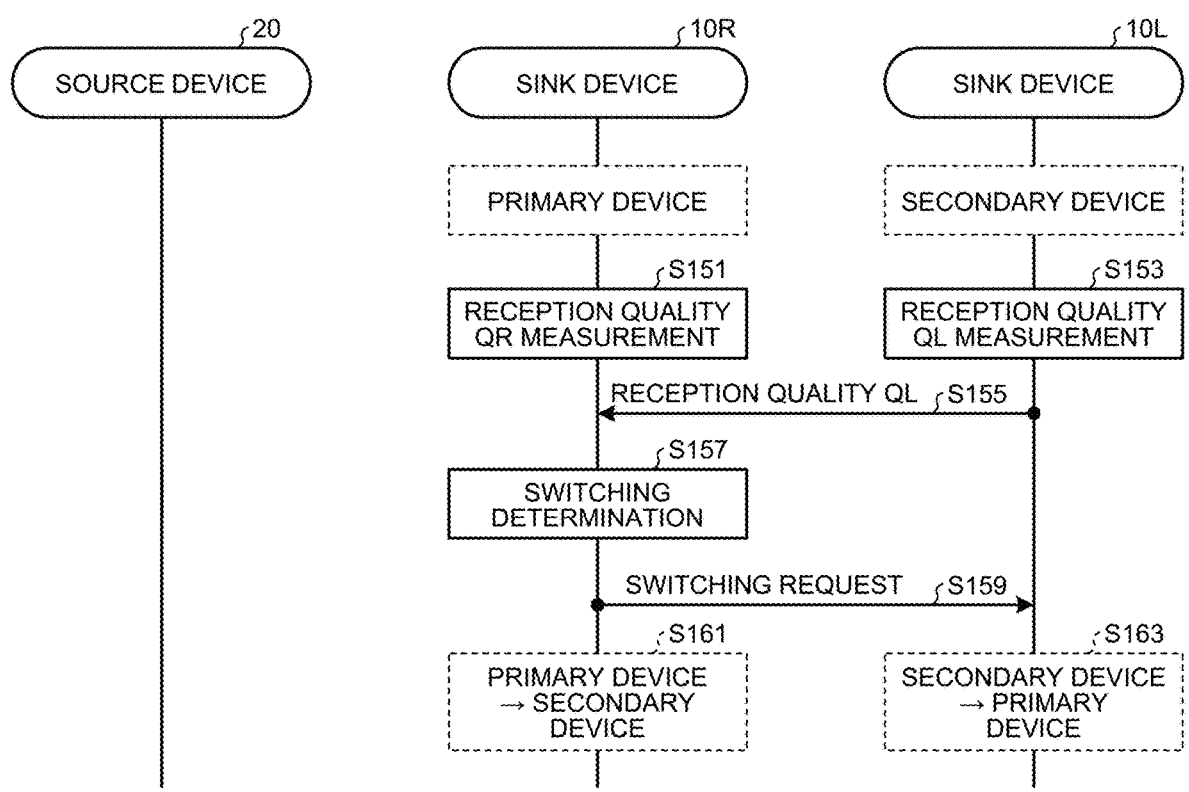
FIG. 4 is a diagram illustrating an example of a processing procedure in the audio system according to the first embodiment of the present disclosure.

<First Processing Example: FIG. 4>

In the processing example, the sink device 10R serving as the primary device determines which of the sink device 10R and the sink device 10L operates as the primary device.

In FIG. 4, first, when the audio apparatus 10 is powered on, for example, the processor 13R sets the sink device 10R as the primary device, and the processor 13L sets the sink device 10L as the secondary device as an initial state.

In step S151, the processor 13R measures the reception quality of the audio data in the sink device 10R (hereinafter, may be referred to as "reception quality QR"), and in step S153, the processor 13L measures the reception quality of the audio data in the sink device 10L (hereinafter, may be referred to as "reception quality QL").

In step S155, the processor 13L notifies the sink device 10R of the reception quality QL measured in step S153.

Here, in general, the reception quality of the audio data changes depending on the reception environment of the audio data, and the better the reception environment is, the higher the reception quality is, and the worse the reception environment is, the lower the reception quality is. That is, the reception environment of the audio data is indicated by the reception quality of the audio data.

Then, in step S157, the processor 13R determines whether or not it is necessary to switch the primary device and the secondary device (hereinafter, may be referred to as "role switching") between the sink device 10R and the sink device 10L by comparing the reception quality QR measured in step S151 with the reception quality QL notified in step S155. The processor 13R determines that role switching is necessary when the reception quality QL is lower than the reception quality QR, and determines that role switching is not necessary when the reception quality QR is lower than the reception quality QL. That is, the processor 13R determines that role switching is necessary when the reception environment of the sink device 10L (hereinafter, may be referred to as a "reception environment ENL") is worse than the reception environment of the sink device 10R (hereinafter, may be referred to as a "reception environment ENR"), and determines that role switching is not necessary when the reception environment ENR is worse than the reception environment ENL. As a result, out of the sink devices 10R and 10L, the role of the device having the worse reception environment becomes a primary, and the role of the device having the better reception environment becomes a secondary. Treat is, out of the sink devices 10R and 10L, the device having the worse reception environment operates as the primary device, and the device having the better reception environment operates as the secondary device. Here, for example, it is assumed that the processor 13R determines that role switching is necessary because the reception quality QL is lower than the reception quality QR.

Then, in step S159, the processor 13R transmits a switching request to the sink device 10L. In addition, in step S161, the processor 13R switches the role of the sink device 10R from the primary to the secondary.

Meanwhile, in step S163, in response to the switching request from the sink device 10R in step S159, the processor 13L switches the role of the sink device 10L from the secondary to the primary.

Therefore, until step S159, the sink device 10R operates as the primary device and the sink device 10L operates as the secondary device, and, from steps S161 and S163, the sink device 10R operates as the secondary device and the sink device 10L operates as the primary device.

In step S157, when it is determined that role switching is not necessary, for example, because the reception quality QR is lower than the reception quality QL, the switching request in step S159 is not transmitted, the sink device 10R continues to operate as the primary device, and the sink device 10L, continues to operate as the secondary device.

Here, the reception quality of the audio data is indicated by, for example, the reception strength of the audio data or the error rate of the audio data. For example, examples of the reception strength of the audio data include received signal strength indication (RSSI), and examples of the error rate of the audio data include a packet error rate (PER). In general, it can be said that the higher the reception strength of the audio data is, the higher the reception quality of the audio data is, and the lower the reception strength of the audio data is, the lower the reception quality of the audio data is. In addition, in general, it can be said that the smaller the error rate of the audio data is, the higher the reception quality of the audio data is, and the greater the error rate of the audio data is, the lower the reception quality of the audio data is. Furthermore, as described above, the better the reception environment is, the higher the reception quality is, and the worse the reception environment is, the lower the reception quality is. Therefore, the reception environment of the audio data is indicated by the reception strength of the audio data or the error rate of the audio data. That is, the better the reception environment is, the greater the reception strength is, and the worse the reception environment is, the smaller the reception strength is. In addition, the better the reception environment is, the smaller the error rate is, and the worse the reception environment is, the greater the error rate is.

Then, for example, in step S151, the processor 13R measures the reception strength of the audio data received by the sink device 10R (hereinafter, may be referred to as "reception strength RR"), and in step S153, the processor 13L measures the reception strength of the audio data received by the sink device 10L (hereinafter, may be referred to as "reception strength RL"). In step S155, the processor 13L notifies the sink device 10R of the reception strength RL. In step S157, the processor 13R determines whether or not role switching is necessary by comparing the reception strength RR with the reception strength RL. The processor 13R determines that role switching is necessary when the reception strength RL is lower than the reception strength RR, and determines that role switching is not necessary when the reception strength RR is lower than the reception strength RL.

In addition, for example, in step S151, the processor 13R measures the error rate of the audio data received by the sink device 10R (hereinafter, may be referred to as an "error rate ER"), and in step S153, the processor 13L measures the error rate of the audio data received by the sink device 10L (hereinafter, may be referred to as an "error rate EL"). In step S155, the processor 13L notifies the sink device 10R of the error rate EL. In step S157, the processor 13R determines whether or not role switching is necessary by comparing the error rate ER with the error rate EL. The processor 13R determines that role switching is necessary when the error rate EL is greater than the error rate ER, and determines that role switching is not necessary when the error rate ER is greater than the error rate EL.

In the following second to fifth processing examples, the reception quality of the audio data is indicated by, for example, the reception strength of the audio data or the error rate of the audio data, as in the first processing example.

Figure 5:
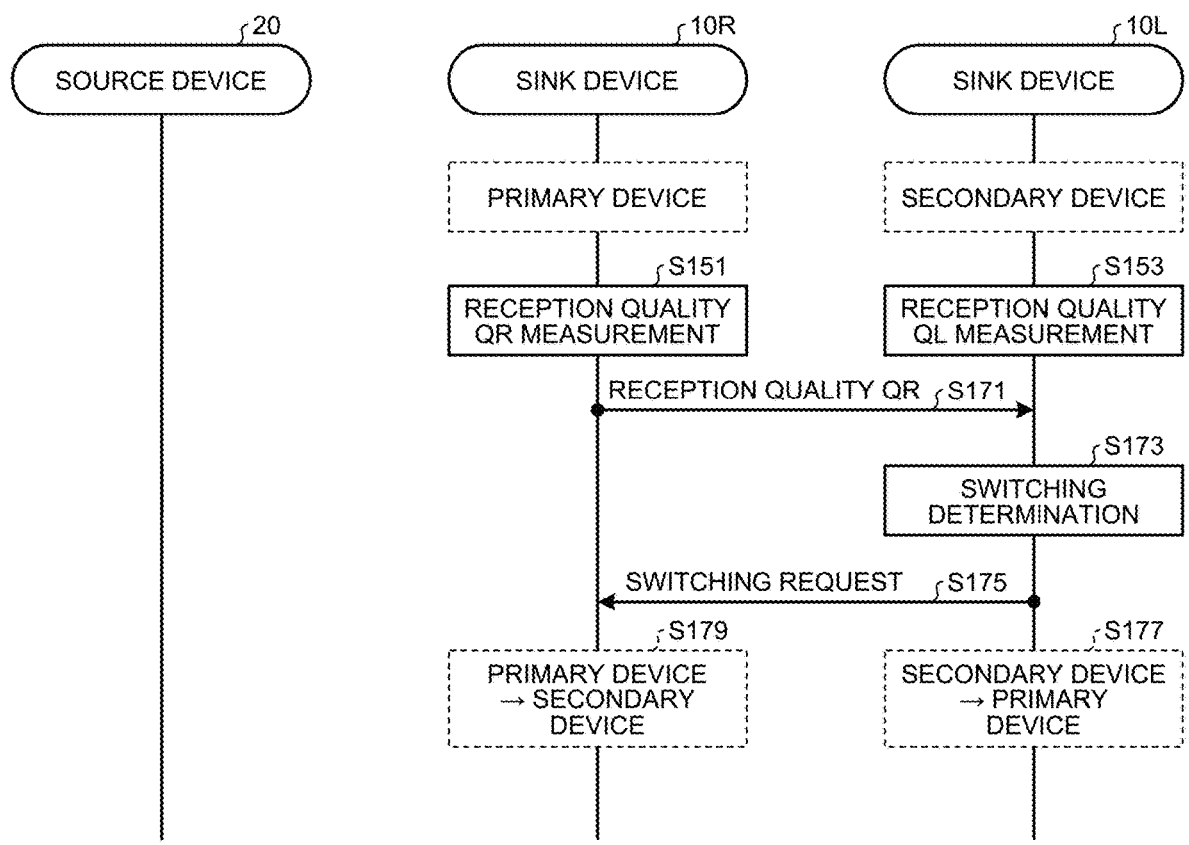
FIG. 5 is a diagram illustrating an example of a processing procedure in the audio system according to the first embodiment of the present disclosure.

<Second Processing Example: FIG. 5>

In the second processing example, the sink device 10L serving as the secondary device determines which of the sink device 10R and the sink device 10L operates as the primary device.

In FIG. 5, first, when the audio apparatus 10 is powered on, for example, the processor 13R sets the sink device 10R as the primary device, and the processor 13L sets the sink device 10L as the secondary device as an initial state, as in the first processing example.

The processing of steps S151 and S153 is the same as that of the first processing example.

In step S171, the processor 13R notifies the sink device 10L of the reception quality QR measured in step S151.

In step S173, the processor 13L determines whether or not role switching is necessary by comparing the reception quality QL measured in step S153 with the reception quality QR notified in step S171. The processor 13L determines that role switching is necessary when the reception quality QL is lower than the reception quality QR, and determines that role switching is not necessary when the reception quality QR is lower than the reception quality QL. Here, for example, it is assumed that the processor 13L determines that role switching is necessary because the reception quality QL is lower than the reception quality QR.

Then, in step S175, the processor 13L transmits the switching request to the sink device 10R. In addition, in step S177, the processor 13L switches the role of the sink device 10L from the secondary to the primary.

Meanwhile, in step S179, in response to the switching request from the sink device 10L in step S175, the processor 13R switches the role of the sink device 10R from the primary to the secondary.

Therefore, until step S175, the sink device 10R operates as the primary device and the sink device 10L operates as the secondary device, and, from steps S177 and S179, the sink device 10R operates as the secondary device and the sink device 10L operates as the primary device.

In step S173, when it is determined that role switching is not necessary, for example, because the reception quality QR is lower than the reception quality QL, the switching request in step S175 is not transmitted, the sink device 10R continues to operate as the primary device, and the sink device 10L continues to operate as the secondary device.

<Third Processing Example: FIG. 6>

In the third processing example, in response to a request from the sink device 10L serving as the secondary device, the sink device 10R serving as the primary device determines which of the sink device 10R and the sink device 10L operates as the primary device.

In FIG. 6, first, when the audio apparatus 10 is powered on, for example, the processor 13R sets the sink device 10R as the primary device, and the processor 13L sets the sink device 10L as the secondary device as an initial state, as in the first processing example.

The processing of steps S151 and S153 is the same as that of the first processing example.

In step S181, the processor 13L determines whether or not the reception quality QL is less than a threshold THL. That is, the processor 13L determines whether or not the reception environment ENL has deteriorated more than a predetermined reception environment. When the reception quality QL is less than the threshold THL (that is, when the reception environment ENL, has deteriorated more than the predetermined reception environment), the processor 13L, in step S183, transmits a determination request to the sink device 10R and notifies the sink device 10R of the reception quality QL measured in step S153. On the other hand, when the reception quality QL is equal to or greater than the threshold THL, the processor 13L does not perform the processing of step S183. Here, for example, since the reception quality QL is less than the threshold THL, it is assumed that the processing of step S183 is performed by the processor 13L.

In step S185, in response to the determination request received in step S183, the processor 13R determines whether or not role switching is necessary by comparing the reception quality QR measured in step S151 with the reception quality QL notified in step S183. The processor 13R determines that role switching is necessary when the reception quality QL is lower than the reception quality QR, and determines that role switching is not necessary when the reception quality QR is lower than the reception quality QL. Here, for example, it is assumed that the processor 13R determines that role switching is necessary because the reception quality QL is lower than the reception quality QR.

Then, in step S187, the processor 13L transmits the switching request to the sink device 10L. In addition, in step S189, the processor 13R switches the role of the sink device 10R from the primary to the secondary.

Meanwhile, in step S191, in response to the switching request from the sink device 10R in step S187, the processor 13L switches the role of the sink device 10L from the secondary to the primary.

Therefore, until step S187, the sink device 10R operates as the primary device and the sink device 10L operates as the secondary device, and, from steps S189 and S191, the sink device 10R operates as the secondary device and the sink device 10L operates as the primary device.

In step S185, when it is determined that role switching is not necessary, for example, because the reception quality QR is lower than the reception quality QL, the switching request in step S87 is not transmitted, the sink device 10R continues to operate as the primary device, and the sink device 10L continues to operate as the secondary device.

<Fourth Processing Example: FIG. 7>

In the fourth processing example, the source device 20 determines which of the sink device 10R and the sink device 10L operates as the primary device.

In FIG. 7, first, when the audio apparatus 10 is powered on, for example, the processor 13R sets the sink device 10R as the primary device, and the processor 13L sets the sink device 10L as the secondary device as an initial state, as in the first processing example.

The processing of steps S151 and S153 is the same as that of the first processing example.

In step S201, the processor 13L notifies the sink device 10R of the reception quality QL measured in step S153.

In step S203, the processor 13R notifies the source device 20 of the reception quality QR measured in step S151 and the reception quality QL notified in step S201.

In step S205, the processor 22 determines whether or not role switching is necessary by comparing the reception quality OR with the reception quality QL. The processor 22 determines that role switching is necessary when the reception quality QL is lower than the reception quality QR, and determines that role switching is not necessary when the reception quality QR is lower than the reception quality QL. Here, for example, it is assumed that the processor 22 determines that role switching is necessary because the reception quality QL is lower than the reception quality QR.

Then, in step S207, the processor 22 transmits the switching request, and the switching request is received by the sink devices 10R and 10L.

In step S209, in response to the switching request from the source device 20 in step S207, the processor 13R switches the role of the sink device 10R from the primary to the secondary.

Meanwhile, in step S211, in response to the switching request from the source device 20 in step S207, the processor 13L switches the role of the sink device 10L from the secondary to the primary.

Therefore, until step S207, the sink device 10R operates as the primary device and the sink device 10L operates as the secondary device, and, from steps S209 and S211, the sink device 10R operates as the secondary device and the sink device 10L operates as the primary device.

In step S205, when it is determined that role switching is not necessary, for example, because the reception quality QR is lower than the reception quality QL, the switching request in step S207 is hot transmitted, the sink device 10R continues to operate as the primary device, and the sink device 10L continues to operate as the secondary device.

<Fifth Processing Exam: FIG. 8>

In the fifth processing example, the source device 20 determines which of the sink device 10R and the sink device 10L operates as the primary device, as in the fourth processing example. However, in the fifth processing exam, the sink devices 10R and 10L, notify the source device 20 of the reception quality in response to a notification request from the source device 20.

In FIG. 8, first, when the audio apparatus 10 is powered on, for example, the processor 13R sets the sink device 10R as the primary device, and the processor 13L sets the sink device 10L as the secondary device as an initial state, as in the first processing example.

In step S221, the processor 22 transmits the notification request of the reception quality, and the notification request is received by the sink devices 10R and 10L.

In step S223, in response to the notification request from the source device 20 in step S221, the processor 13R measures the reception quality QR. In step S225, the processor 13R notifies the source device 20 of the reception quality QR measured in step S223.

Meanwhile, in step S227, in response to the notification request from the source device 20 in step S221, the processor 13L measures the reception quality QL. In step S229, the processor 13L notifies the source device 20 of the reception quality QL measured in step S227.

Since the subsequent processing is the same as that of the fourth processing example, the description thereof will be omitted.

The first embodiment has been described above.

Second Embodiment

<Configuration of an Audio System>

FIG. 9 is a diagram illustrating a configuration example of an audio system according to a second embodiment of the present disclosure. In FIG. 9, the sink device 10R further includes a distance sensor 17R, and the sink device 10L further includes a distance sensor 17L. The distance sensor 17R detects a distance between the sink device 10R and the source device 20 (hereinafter, may be referred to as a "distance DR"), and the distance sensor 17L detects a distance between the sink device 10L and the source device 20 (hereinafter, may be referred to as a "distance DL").

<Processing Procedure in the Audio System>

FIGS. 10 to 11 are diagrams illustrating an example of a processing procedure in the audio system according to the second embodiment of the present disclosure. Hereinafter, sixth and seventh processing examples will be described as examples of the processing procedure in the audio system according to the second embodiment.

<Sixth Processing Example: FIG. 10>

As the distance between the sink device 10RL and the source device 20 (hereinafter, may be referred to as an "S-S distance") increases, the propagation loss of the audio data in the wireless space between the sink device 10RL and the source device 20 increases. Therefore, the reception quality of the audio data is indicated by the S-S distance. In general, it can be said that the smaller the S-S distance is, the higher the reception quality of the audio data is, and the greater the S-S distance is, the lower the reception quality of the audio data is. Furthermore, as described above, the better the reception environment is, the higher the reception quality is, and the worse the reception environment is, the lower the reception quality is. Therefore, the reception environment of the audio data is indicated by the S-S distance. That is, the smaller the S-S distance is, the better the reception environment is, and the greater the S-S distance is, the worse the reception environment is.

Then, in FIG. 10, in step S301, when the power of the audio apparatus 10 is powered on, the distance sensor 17R detects the distance DR and outputs the detected distance DR to the processor 13R.

Meanwhile, in step S303, when the power of the audio apparatus 10 is powered on, the distance sensor 17L detects the distance DL and outputs the detected distance DL to the processor 13L.

In step S305, the processor 13L notifies the sink device 10R of the distance DL detected in step S303.

In step S307, the processor 13R notifies the source device 20 of the distance DR detected in step S301 and the distance DL notified in step S305.

In step S309, the processor 22 determines the sink device 10RL operating as the primary device and the sink device 10RL operating as the secondary device by comparing the distance DR with the distance DL. That is, in step S309, the processor 22 determines the roles of each of the sink devices 10R and 10L by comparing the distance DR and the distance DL. When the distance DR is greater than the distance DL, the processor 22 determines the sink device 10R as the primary device, and determines the sink device 10L as the secondary device. On the other hand, when the distance DL is greater than the distance DR, the processor 22 determines the sink device 10L as the primary device, and determines the sink device 10R as the secondary device. That is, the processor 22 determines the sink device 10R as the primary device when the reception environment ENR is worse than the reception environment ENL, and determines the sink device 10L as the primary device when the reception environment ENL, is worse than the reception environment ENR. When the distance DR is equal to the distance DL, either the sink device 10R or 10L may be set as the primary device.

In step S311, the processor 22 transmits a determination result in step S309, and the determination result is received by the sink devices 10R and 10L.

In step S313, in response to the determination result transmitted from the source device 20 in step S311, the processor 13R sets the role of the sink device 10R to the primary or the secondary.

In addition, in step S315, in response to the determination result transmitted from the source device 20 in step S311, the processor 13L sets the role of the sink device 10L to the primary or the secondary.

<Seventh Processing Example: FIG. 11>

In FIG. 11, first, when the audio apparatus 10 is powered on, for example, the processor 13R sets the sink device 10R as the primary device, and the processor 13L sets the sink device 10L as the secondary device as an initial state, as in the first processing example.

The processing of steps S301, S303, S305, and S307 is the same as that of the sixth processing example.

In step S321, the processor 22 determines whether or not role switching is necessary by comparing the distance DR with the distance DL. The processor 22 determines that role switching is necessary when the distance DL is greater than the distance DR, and determines that role switching is not necessary when the distance DR is greater than the distance DL. That is, the processor 22 determines that role switching is necessary when the reception environment ENL is worse than the reception environment ENR, and determines that role switching is not necessary when the reception environment ENR is worse than the reception environment ENL. Thus, out of the sink devices 10R and 10L, the device having the worse reception environment operates as the primary device, and the device having the better reception environment operates as the secondary device. Here, for example, it is assumed that the processor 22 determines that role switching is necessary because the distance DL is greater than the distance DR.

Then, in step S323, the processor 22 transmits the switching request, and the switching request is received by the sink devices 10R and 10L.

In step S325, in response to the switching request from the source device 20 in step S323, the processor 13R switches the role of the sink device 10R from the primary to the secondary.

Meanwhile, in step S327, in response to the switching request from the source device 20 in step S323, the processor 13L, switches the role of the sink device 10L from the secondary to the primary.

Therefore, until step S323, the sink device 10R operates as the primary device and the sink device 10L operates as the secondary device, and, from steps S325 and S327, the sink device 10R operates as the secondary device and the sink device 10L operates as the primary device.

In step S321, when it is determined that role switching is not necessary, for example, because the distance DR is greater than the distance DL, the switching request in step S323 is not transmitted, the sink device 10R continues to operate as the primary device, and the sink device 10L continues to operate as the secondary device.

The second embodiment has been described above.

Note that the sixth processing example may be implemented in combination with any of the first to fifth processing examples or the seventh processing example. That is, in the first to fifth processing examples and the seventh processing example, the role of the sink device 10RL in the initial state may be determined according to the sixth processing example.

In the above-described first and second embodiments, the case where the sink device 10R reproduces the R sound and the sink device 10L reproduces the L sound has been described as an example. However, the audio apparatus 10 may be an audio apparatus in which both the sink devices 10R and 10L reproduce both the R sound and the L sound.

In addition, in the above-described first and second embodiments, the case where the audio apparatus 10 is a completely wireless earphone has been described as an example. However, the audio apparatus 10 is not limited to the completely wireless earphone. For example, the audio apparatus 10 may be a speaker device of an interception system.

Effects of the Disclosed Technique

As described above, an audio apparatus according to the present disclosure (the audio apparatus 10 according to the first and second embodiments) includes a first device and a second device (the sink devices 10R and 10L according to the first and second embodiments). The first device and the second device each receive the same audio data transmitted from a source device (the source device 20 according to the first and second embodiments). Out of the first device and the second device, a device having the worse reception environment of the audio data operates as a primary device that performs the retransmission request for the audio data to the source device, and a device having the better reception environment of the audio data operates as a secondary device that performs the retransmission request for the audio data to the primary device.

For example, a first reception strength that is the reception strength of the first device indicates the reception environment of the first device, and a second reception strength that is the reception strength of the second device indicates the reception environment of the second device. Then, when the first reception strength is lower than the second reception strength, the first device operates as the primary device while the second device operates as the secondary device. In addition, when the second reception strength is lower than the first reception strength, the second device operates as the primary device while the first device operates as the secondary device.

In addition, for example, a first error rate that is the error rate of the audio data received by the first device indicates the reception environment of the first device, and a second error rate that is the error rate of the audio data received by the second device indicates the reception environment of the second device. Then, when the first error rate is greater than the second error rate, the first device operates as the primary device while the second device operates as the secondary device. In addition, when the second error rate is greater than the first error rate, the second device operates as the primary device while the first device operates as the secondary device.

In addition, for example, a first distance that is the distance between the first device and the source device indicates the reception environment of the first device, and a second distance that is the distance between the second device and the source device indicates the reception environment of the second device. Then, when the first distance is greater than the second distance, the first device operates as the primary device while the second device operates as the secondary device, and when the second distance is greater than the first distance, the second device operates as the primary device while the first device operates as the secondary device.

In addition, for example, either the first device or the second device determines which of the first device and the second device operates as the primary device.

In addition, for example, when the reception environment of the secondary device deteriorates more than a predetermined reception environment, the primary device determines which of the first device and the second device operates as the primary device.

In addition, for example, either the first device or the second device operates as the primary device in response to a request from the source device.

With the above-described configuration, the retransmission request from the secondary device to the primary device is suppressed, and thus the frequency of the occurrence of the P-S communication decreases. Therefore, it is possible to suppress the occurrence of retransmission of the audio data due to timeout between the source device and the primary device. Therefore, it is possible to suppress interruption of the sound reproduced by the audio apparatus.

Note that the effects described herein are merely examples and are not subject to limitations, and other effects may be provided.

The disclosed technique may also have the following configurations.

(1) An audio apparatus comprising:
   a first device and a second device that each receive the same audio data transmitted from a source device,
   wherein a device having a worse reception environment of the audio data out of the first device and the second device operates as a primary device that performs a retransmission request for the audio data to the source device, and
   a device having a better reception environment out of the first device and the second device operates as a secondary device that performs the retransmission request to the primary device.

(2) The audio apparatus according to (1),
wherein a first reception strength that is a reception strength of the first device indicates the reception environment of the first device,
a second reception strength that is a reception strength of the second device indicates the reception environment of the second device,
the first device operates as the primary device while the second device operates as the secondary device when the first reception strength is lower than the second reception strength, and
the second device operates as the primary device while the first device operates as the secondary device when the second reception strength is lower than the first reception strength.

(3) The audio apparatus according to (1),
wherein a first error rate that is an error rate of the audio data received by the first device indicates the reception environment of the first device,
a second error rate that is an error rate of the audio data received by the second device indicates the reception environment of the second device,
the first device operates as the primary device while the second device operates as the secondary device when the first error rate is greater than the second error rate, and
the second device operates as the primary device while the first device operates as the secondary device when the second error rate is greater than the first error rate.

(4) The audio apparatus according to claim (1),
wherein a first distance that is a distance between the first device and the source device indicates the reception environment of the first device,
a second distance that is a distance between the second device and the source device indicates the reception environment of the second device,
the first device operates as the primary device while the second device operates as the secondary device when the first distance is greater than the second distance, and
the second device operates as the primary device while the first device operates as the secondary device when the second distance is greater than the first distance.

(5) The audio apparatus according to any one of (1) to (4), wherein either the first device or the second device determines which of the first device and the second device operates as the primary device.

(6) The audio apparatus according to any one of (1) to (4), wherein the primary device determines which of the first device and the second device operates as the primary device when the reception environment of the secondary device deteriorates more than a predetermined reception environment.

(7) The audio apparatus according to any one of (1) to (4), wherein either the first device or the second device operates as the primary device in response to a request from the source device.

(8) An audio apparatus operation method for an audio apparatus including a first device and a second device that each receive the same audio data transmitted from a source device, the method comprising:
operating as a primary device that performs a retransmission request for the audio data to the source device at a device having a worse reception environment of the audio data out of the first device and the second device; and
operating as a secondary device that performs the retransmission request to the primary device at a device having a better reception environment out of the first device and the second device.

REFERENCE SIGNS LIST

1 Audio System
10 Audio Apparatus
10R, 10L Sink Device
20 Source Device

The invention claimed is:
1. An audio apparatus comprising:
a first device and a second device each of which is configured to receive audio data transmitted from a source device, wherein
a device having a worse reception environment of the audio data out of the first device and the second device operates as a primary device that performs a retransmission request for the audio data to the source device, and
a device having a better reception environment of the audio data out of the first device and the second device operates as a secondary device that performs the retransmission request for the audio data to the primary device, and further wherein
the device operating as the secondary device is configured to notify the device operating as the primary device of a reception environment of the audio data at the secondary device,
the device operating as the primary device is configured to notify the source device of the reception environment of the audio data at the secondary device and a reception environment of the audio data at the primary device, and
the device operating as the primary device is further configured to switch to operating as the secondary device and the device operating as the secondary device is further configured to switch to operating as the primary device in response to a switching request from the source device in a case where the source device determines that the reception environment of the audio data at the secondary device is lower than the reception environment of the audio data at the primary device.

2. The audio apparatus according to claim 1, wherein
a first reception strength that is a reception strength of the first device indicates the reception environment of the first device,
a second reception strength that is a reception strength of the second device indicates the reception environment of the second device,
the first device operates as the primary device while the second device operates as the secondary device when the first reception strength is lower than the second reception strength, and
the second device operates as the primary device while the first device operates as the secondary device when the second reception strength is lower than the first reception strength.

3. The audio apparatus according to claim 1, wherein
a first error rate that is an error rate of the audio data received by the first device indicates the reception environment of the first device,
a second error rate that is an error rate of the audio data received by the second device indicates the reception environment of the second device, the first device operates as the primary device while the second device operates as the secondary device when the first error rate is greater than the second error rate, and the second device operates as the primary device while the first device operates as the secondary device when the second error rate is greater than the first error rate.

4. The audio apparatus according to claim 1, wherein a first distance that is a distance between the first device and the source device indicates the reception environment of the first device, a second distance that is a distance between the second device and the source device indicates the reception environment of the second device, the first device operates as the primary device while the second device operates as the secondary device when the first distance is greater than the second distance, and the second device operates as the primary device while the first device operates as the secondary device when the second distance is greater than the first distance.

5. An audio apparatus operation method for an audio apparatus including a first device and a second device each of which receives audio data transmitted from a source device, the method comprising:

causing a device having a worse reception environment of the audio data out of the first device and the second device to operate as a primary device that performs a retransmission request for the audio data to the source device;

causing a device having a better reception environment of the audio data out of the first device and the second device to operate as a secondary device that performs the retransmission request for the audio data to the primary device;

causing the device operating as the secondary device to notify the device operating as the primary device of a reception environment of the audio data at the secondary device;

causing the device operating as the primary device to notify the source device of the reception environment of the audio data at the secondary device and a reception environment of the audio data at the primary device; and causing the device operating as the primary device to switch to operating as the secondary device and causing the device operating as the secondary device to switch to operating as the primary device in response to a switching request from the source device in a case where the source device determines that the reception environment of the audio data at the secondary device is lower than the reception environment of the audio data at the primary device.

6. An audio apparatus comprising:

a first device and a second device each of which is configured to receive audio data transmitted from a source device, wherein a device having a worse reception environment of the audio data out of the first device and the second device operates as a primary device that performs a retransmission request for the audio data to the source device, a device having a better reception environment of the audio data out of the first device and the second device operates as a secondary device that performs the retransmission request for the audio data to the primary device, the source device is configured to transmit a notification request to the device operating as the primary device and the device operating as the secondary device, the device operating as the primary device is configured to notify the source device of a reception environment of the audio data at the primary device in response to the notification request transmitted from the source device, the device operating as the secondary device is configured to notify the source device of a reception environment of the audio data at the secondary device in response to the notification request transmitted from the source device, and the device operating as the primary device is further configured to switch to operating as the secondary device and the device operating as the secondary device is further configured to switch to operating as the primary device in response to a switching request from the source device in a case where the source device determines that the reception environment of the audio data at the secondary device is lower than the reception environment of the audio data at the primary device.

* * * * *